United States Patent
Lu et al.

(10) Patent No.: US 12,089,277 B2
(45) Date of Patent: Sep. 10, 2024

(54) METHOD FOR SENDING INFORMATION, METHOD FOR RECEIVING INFORMATION AND DEVICE

(71) Applicant: GUANGDONG OPPO MOBILE TELECOMMUNICATIONS CORP., LTD., Dongguan (CN)

(72) Inventors: Qianxi Lu, Dongguan (CN); Zhenshan Zhao, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 190 days.

(21) Appl. No.: 17/486,100

(22) Filed: Sep. 27, 2021

(65) Prior Publication Data
US 2022/0015180 A1 Jan. 13, 2022

Related U.S. Application Data

(63) Continuation of application No. PCT/CN2019/080192, filed on Mar. 28, 2019.

(51) Int. Cl.
*H04W 76/20* (2018.01)
*H04W 4/40* (2018.01)
*H04W 4/70* (2018.01)
*H04W 28/02* (2009.01)

(52) U.S. Cl.
CPC ............ *H04W 76/20* (2018.02); *H04W 4/40* (2018.02); *H04W 4/70* (2018.02); *H04W 28/0278* (2013.01)

(58) Field of Classification Search
None
See application file for complete search history.

(56) References Cited

U.S. PATENT DOCUMENTS

| 2018/0234889 A1 | 8/2018 | Baghel et al. |
| 2018/0332620 A1 | 11/2018 | Malladi et al. |
| 2019/0053193 A1* | 2/2019 | Park ............... H04W 72/51 |

(Continued)

FOREIGN PATENT DOCUMENTS

| CN | 106465369 A | 2/2017 |
| CN | 109479292 A | 3/2019 |

(Continued)

OTHER PUBLICATIONS

Second Office Action issued in corresponding Japanese Application No. 2021-557683, mailed Mar. 31, 2023.

(Continued)

*Primary Examiner* — Christine T Duong
(74) *Attorney, Agent, or Firm* — BAYES PLLC

(57) ABSTRACT

Disclosed are a method for sending information, a terminal device and a network device. The method for sending information is applied to the terminal device that operates at least in a device-to-device (D2D) communication mode based on a first radio access technology (RAT). The method includes the terminal device sending Radio Resource Control (RRC) information to the network device operating in a second RAT. The RRC information includes service information of D2D communication based on the first RAT.

17 Claims, 3 Drawing Sheets

(56) References Cited

U.S. PATENT DOCUMENTS

2019/0274121 A1* 9/2019 Wu .................. H04W 72/23

FOREIGN PATENT DOCUMENTS

| | | |
|---|---|---|
| EP | 3651539 A1 | 5/2020 |
| WO | 2019/006085 A1 | 1/2019 |

OTHER PUBLICATIONS

Second Office Action issued in corresponding European Application No. 19921832.2, mailed May 24, 2023.
3GPP TS 37.340 V15.4.0 (Dec. 2018); Technical Specification Group Radio Access Network; Evolved Universal Terrestrial Radio Access (E-UTRA) and NR; Multi-connectivity; Stage 2 (Release 15).
Extended European Search Report issued in corresponding European Application No. 19921832.2, mailed Mar. 7, 2022, 14 pages.
First Office action issued in corresponding India Application No. 202127044241, mailed Apr. 25, 2022, 7 pages.
"Consideration on NR V2X mode 1 resource allocation", Agenda: 11.4.2.2, Source, ZTE, Sanechips, 3GPP TSG RAN WG2 Meeting #105, R2-1900380, Athens, Greece, Feb. 25-Mar. 1, 2019, 5 pages.
"Cross-RAT sidelink configuration in MR-DC", Agenda Item: 11.4.2.5, Source: LG Electronics Inc., 3GPP TSG-RAN WG2 #104, R2-1818424, Spokane, USA, Nov. 12-16, 2018, 2 pages.
Shanzhi Chen et al., "Vehicle-to-Everything (v2x) Services Supported by LTE-based Systems and 5g", IEEE Communications Standards Magazine • Jun. 2017, 7 pages.
"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.4.0 (Dec. 2018), 932 pages.
First Office Action issued in corresponding Chinese Application No. 201980064275.2, mailed Jun. 9, 2022.
Decision of Rejection issued in corresponding Chinese Application No. 201980064275.2, mailed Aug. 10, 2022.
International Search Report issued in corresponding International Application No. PCT/CN2019/080192, mailed Jan. 2, 2020, 31 pages.
PCT Written Opinion of the International Searching Authority issued in corresponding International Application No. PCT/CN2019/080192, mailed Jan. 2, 2020, 6 pages.
"On RRM requirements for D2D", Agenda Item: 7.12.3, Source: Ericsson, 3GPP TSG-RAN WG4 Meeting #72, R4-144951, Dresden, Germany, Aug. 18-22, 2014, 4 pages.
"New SID: Study on NR V2X", Agenda Item: 9.1.5, Source: Vodafone, 3GPP TSG RAN Meeting #80, RP-181480, La Jolla, USA, Jun. 11-14, 2018, 5 pages.
First Office Action issued in corresponding European Application No. 19921832.2, mailed Dec. 2, 2022.
First Office Action issued in corresponding Japanese Application No. 2021-557683, mailed Dec. 16, 2022.
Oppo, "Discussion on eV2X mode-3", R2-1804360, 3GPP TSG-RAN2 Meeting #101bis Sanya, China, Apr. 16-Apr. 20, 2018.
ZTE, Sanechips, "Consideration on RAT and Interface Selection in NR V2X", R2-1900385, 3GPP TSG-RAN WG2 Meeting #105 Athens, Greece, Feb. 25-Mar. 1, 2019.
Notice of reexamination issued in corresponding Chinese Application No. 201980064275.2, mailed Oct. 9, 2023.
Notice of Allowance issued in corresponding European Application No. 19921832.2, mailed Nov. 21, 2023.
Xu Ning, "Cellular Mobile Air interface evolution of communication systems—LTE, LTE-A, LTEPro and 5G", Beijing University of Posts and Telecommunications Press, pp. 351, 400. Oct. 31, 2017.
Decision of Reexamination issued in corresponding Chinese Application No. 201980064275.2, mailed Dec. 29, 2023.
Request for the Submission of an Opinion issued in corresponding Korean Application No. 10-2021-7032672, mailed on Jul. 19, 2024, 11 pages.

* cited by examiner

METHOD FOR SENDING INFORMATION, METHOD FOR RECEIVING INFORMATION AND DEVICE

CROSS-REFERENCE TO RELATED APPLICATION

This application is a continuation of International Application No. PCT/CN2019/080192, filed on Mar. 28, 2019, the entire contents of which are hereby incorporated by reference.

BACKGROUND

The embodiments of the present disclosure relate to the field of communications, and more particularly, to a method for sending information, a method for receiving information, and a device.

Device-to-device communication is a sidelink (SL) transmission technology based on device to device (D2D), such as Vehicle to Everything (V2X). Different from the traditional cellular system in which communication data is received or sent through a base station, the Internet of Vehicles system adopts device-to-device direct communication, and thus has higher spectrum efficiency and lower transmission delay.

The D2D in the related art is only limited to Long Term Evolution (LTE), that is, the D2D only operates in a cellular network based on LTE.

SUMMARY

Provided are a method for sending information, a method for receiving information and a device.

In a first aspect, a method for sending information is provided, which is applied to a terminal device, and the terminal device operates at least in a device-to-device (D2D) communication mode based on a first Radio Access Technology (RAT), the method including sending, by the terminal device, media access control RRC information to a network device operating in a second RAT, where the RRC information includes service information of D2D communication based on the first RAT.

In the embodiments of the present disclosure, the terminal device operating at least in the device-to-device D2D communication mode based on the first RAT reports RRC information to the network device operating in the second RAT, which can not only realize D2D communication in the multi-RAT scenarios, but can also realize D2D communication in cross-RAT scenarios, effectively improving the applicability of the D2D communication.

In a second aspect, a method for receiving information is provided, which is applied to a network device operating based on a second radio access technology RAT, and the method including receiving, by the network device, media access control RRC information at least operating in a device-to-device D2D communication mode based on a first RAT, where the RRC information includes service information of D2D communication based on the first RAT.

In a third aspect, a terminal device is provided, which is configured to perform the method in the foregoing first aspect or the implementations thereof. Specifically, the terminal device includes one or more functional modules configured to perform the method in the foregoing first aspect or the implementations thereof.

In a fourth aspect, a network device is provided, which is configured to perform the method in the foregoing second aspect or the implementations thereof. Specifically, the network device includes one or more functional modules configured to perform the method in the foregoing second aspect or the implementations thereof.

In a fifth aspect, there is provided a terminal device including a processor and a memory. The memory is configured to store a computer program, and the processor is configured to call and run the computer program stored in the memory to perform the method in the above first aspect or the implementations thereof.

In a sixth aspect, there is provided a network device including a processor and a memory. The memory is configured to store a computer program, and the processor is configured to call and run the computer program stored in the memory to perform the method in the above second aspect or the implementations thereof.

In a seventh aspect, a chip is provided for implementing the method in any one of the first aspect to the second aspect or the implementations thereof. Specifically, the chip includes: a processor, configured to call and run a computer program from a memory to cause a device installed with the chip to perform the method in any one of the above first aspect to second aspect or the implementations thereof.

In an eighth aspect, there is provided a computer-readable storage medium for storing a computer program that causes a computer to perform the method in any one of the above first to the second aspects or the implementations thereof.

In a ninth aspect, there is provided a computer program product including computer program instructions that cause a computer to perform the method in any one of the above first to the second aspects or the implementations thereof.

In a tenth aspect, there is provided a computer program which, when running on a computer, causes the computer to perform the method in any one of the above first to the second aspects or the implementations thereof.

DETAILED DESCRIPTION

The technical solutions in the embodiments of the present disclosure will be described below in conjunction with the accompanying drawings.

The embodiments of the present disclosure can be applied to any device-to-device communication framework.

Examples include Vehicle to Vehicle (V2V), Vehicle to Everything (V2X), Device to Device (D2D), etc.

The terminal in the embodiments of the present disclosure may be any device or apparatus configured with a physical layer and a media access control layer, and the terminal device may also be referred to as an access terminal, such as user equipment (UE), a user unit, a user station, a mobile station, a mobile platform, a remote station, a remote terminal, a mobile device, a user terminal, a terminal, a wireless communication device, a user agent, or a user device. The access terminal can be a cellular phone, a cordless phone, a Session Initiation Protocol (SIP) phone, a Wireless Local Loop (WLL) station, a Personal Digital Assistant (PDA), a wireless communication functional handheld device, a computing device or other processing devices connected to a wireless modem, a vehicle-mounted device, a wearable devices, etc. The embodiments of the present disclosure will be described by taking a vehicle-mounted terminal as an example, but it is not limited thereto.

Optionally, in some embodiments of the present disclosure, the embodiments of the present disclosure may be applicable to transmission mode 3 and transmission mode 4 defined in 3rd Generation Partnership Project (3GPP) Rel-14.

Figure 1:
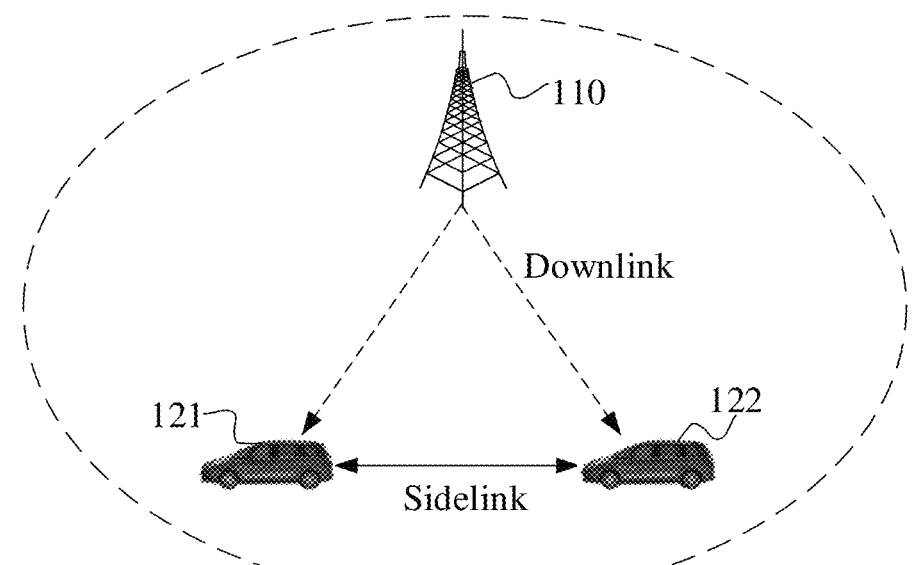
FIG. 1 is a schematic frame diagram of a transmission mode according to an embodiment of the present disclosure.
Figure 2:
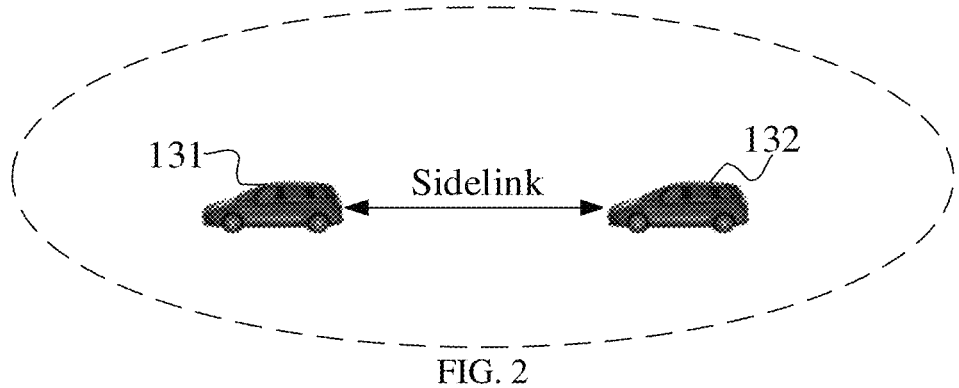
FIG. 2 is a schematic frame diagram of another transmission mode according to an embodiment of the present disclosure.

FIG. 1 is a schematic diagram of mode 3 according to an embodiment of the present disclosure. FIG. 2 is a schematic diagram of mode 4 according to an embodiment of the present disclosure.

In the transmission mode 3 shown in FIG. 1, the transmission resources of a vehicle-mounted terminal (a vehicle-mounted terminal 121 and a vehicle-mounted terminal 122) are assigned by a base station 110, and the vehicle-mounted terminal transmits data on a sidelink according to the resources assigned by the base station 110. Specifically, the base station 110 may assign resources for a single transmission to the terminal, or may assign resources for semi-persistent transmission to the terminal.

In the transmission mode 4 shown in FIG. 2, the vehicle-mounted terminal (vehicle-mounted terminal 131 and vehicle-mounted terminal 132) adopts a sensing and reservation transmission mode, and autonomously selects transmission resources for data transmission from the resources of the sidelink.

The following description is given by taking the vehicle-mounted terminal 131 as an example.

The vehicle-mounted terminal 131 obtains a set of available transmission resources in a resource pool by means of sensing, and randomly selects, from the set, a transmission resource for data transmission.

Since the services in the Internet of Vehicles system have periodic characteristics, in the embodiments of the present disclosure, the vehicle-mounted terminal 131 may also adopt semi-persistent transmission. That is, after acquiring a transmission resource, the vehicle-mounted terminal 131 continuously uses this transmission resource in multiple transmission periods so as to reduce the probability of resource reselection and resource conflicts.

The vehicle-mounted terminal 131 can carry, in control information of the current transmission, information for reserving a resource for the next transmission, so that other terminals (for example, the vehicle-mounted terminal 132) can determine whether this resource is reserved and used by the user by detecting the control information of the user, thereby achieving the purpose of reducing resource conflicts.

It should be noted that the vehicle-mounted terminal involved in the embodiments of the present disclosure may be applicable in scenarios with high data interaction efficiency such as automatic driving.

The vehicle-mounted terminal 131 and the vehicle-mounted terminal 132 may operate in a D2D communication mode based on the same RAT, or may operate in D2D communication modes based on different RATs. For example, the vehicle-mounted terminal 131 may operate in an NR-based cellular network, and the vehicle-mounted terminal 132 may operate in an LTE-based cellular network.

In such cases, how to implement D2D service reporting in such a cross-RAT scenario is an urgent problem for those skilled in the art to solve.

Figure 3:
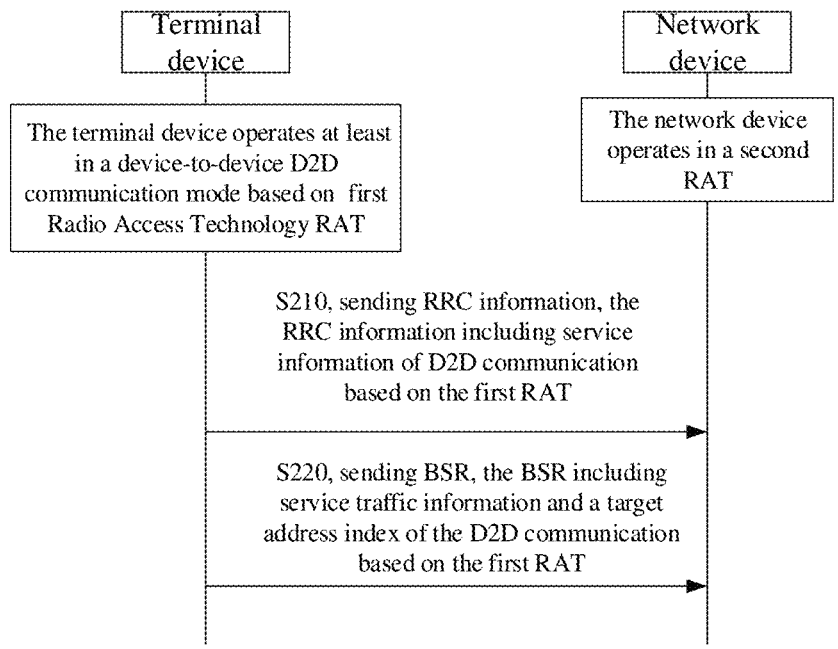
FIG. 3 is a schematic flowchart of a communication method according to an embodiment of the present disclosure.

FIG. 3 is a schematic flowchart of a communication method 200 according to an embodiment of the present disclosure. The method 200 can be performed by a terminal device. The terminal device shown in FIG. 3 may be the vehicle-mounted terminal shown in FIG. 1 or FIG. 2, and the network device shown in FIG. 3 may be the access network device shown in FIG. 1. It should be understood that the terminal device operates at least in a device-to-device D2D communication mode based on a first Radio Access Technology (RAT), the network device operates in a second RAT, and the first RAT and the second RAT can be different RATs. For example, the first RAT may be an LTE access technology, and the second RAT may be an NR access technology. For another example, the first RAT may be the NR access technology, and the second RAT may be the LTE access technology.

As shown in FIG. 3, the communication method 200 may include the following.

In S210, the terminal device sends Radio Resource Control (RRC) information to the network device, where the RRC information includes service information of D2D communication based on the first RAT.

The terminal device operating at least in the D2D communication mode based on the first RAT can be understood as that the terminal device is configured with a first terminal interface (such as a PC5 interface) for D2D communication with other terminal devices based on the first RAT, that is, the terminal device can perform the D2D communication with the other terminal devices through the first terminal interface. Further, the terminal device may also operate in the D2D communication mode based on the second RAT. In such cases, the terminal device may also be configured with a second terminal interface for the D2D communication with the other terminal devices based on the second RAT, that is, the terminal device can perform the D2D communication with the other terminal devices through the second terminal interface. In other words, the first RAT corresponds to the first terminal interface, and the second RAT corresponds to the second terminal interface.

In an example where the first RAT is the NR radio access technology and the second RAT is the LTE radio access technology, the terminal device may be NR-V2X, and may operate in an LTE-based cellular network. In an example where the second RAT is the NR radio access technology and the first RAT is the LTE radio access technology, the terminal device may be LTE-V2X, and may operate in an NR-based cellular network. Further, the terminal device can not only realize the NR-V2X function, but also realize the LTE-V2X function.

The network device operating in the first RAT can be understood as that the network device is configured with a first network interface (such as a Uu interface) for communicating with the terminal device based on the first RAT, that is, the network device can communicate with the terminal device through the first network interface. Of course, the network device may also be configured with a second network interface for communicating with the terminal device based on the second RAT, that is, the network device may communicate with the terminal device through the second network interface.

Similar to the network device, the terminal device may also be configured with the first network interface and the second network interface, and the terminal device may report information to the network device through the first network interface and/or the second network interface. For example, the terminal device reports the RRC information to the network device through the first network interface and/or the second network interface.

In the embodiments of the present disclosure, the terminal device operating at least in the device-to-device D2D communication mode based on the first RAT reports the RRC information to the network device operating in the second RAT, which can not only realize D2D communication in the multi-RAT scenarios, but can also realize D2D communication in the cross-RAT scenarios, effectively improving the applicability of the D2D communication.

It should be understood that, in the present disclosure, for ease of understanding, the interface through which the terminal device performs the D2D communication with other terminal devices based on the first RAT is referred to as the first terminal interface, and the interface through which the terminal device performs the D2D communication with other terminal devices based on the second RAT is referred to as the second terminal interface. Similarly, the interface through which the terminal device performs communication with the network device based on the first RAT is referred to as the first network interface, and the interface through which the terminal device performs communication with the network device based on the second RAT is referred to as the second network interface. However, this description manner should not limit the technical solutions of the embodiments of the present disclosure.

In some other alternative embodiments, the first terminal interface and the second terminal interface are soft interfaces, that is, they may be physically the same interface. Similarly, the first network interface and the second network interface may also be soft interfaces, that is, they may be physically the same interface. For example, when the terminal device sends information to the network device, different protocols, versions, standards or modes (similar to different terminal interfaces) are used to define the information to be sent. In such cases, the different protocols, versions, standards or modes can be understood as different interfaces.

In short, the terminal device may perform the D2D communication with other terminal devices based on the first RAT and/or the second RAT, and the terminal device may also perform communication with the network device based on the first RAT or the second RAT.

In above S210, if the terminal device further operates in the D2D communication mode based on the second RAT, the RRC information may further include service information of the D2D communication based on the second RAT. That is, the terminal device may report to the network device the service information of the D2D communication based on the first RAT and the service information of the D2D communication based on the second RAT simultaneously.

The service information of the terminal device may also be referred to as Sidelink UE Information of the terminal device, which may include frequency points and a list of target addresses used by the terminal device to perform the D2D communication.

That is, the RRC information may include the frequency points and the list of target addresses for the D2D communication based on the first RAT, and the frequency points and the list of target addresses for the D2D communication based on the second RAT. Optionally, a format of the list of the target addresses for the D2D communication based on the first RAT and a format of the list of the target addresses for the D2D communication based on the second RAT may be different or may be the same, which is not specifically limited in the embodiments of the present disclosure.

In above S210, when the RRC information further includes the service information of the D2D communication based on the second RAT, the terminal device may also send first indication information to the network device, where the first indication information is used for indicating that the RRC information includes the service information of the D2D communication based on the first RAT and/or the service information of the D2D communication based on the second RAT.

For example, the first indication information may be used to indicate that the RRC information includes only the service information for the D2D communication based on the first RAT, that is, includes the frequency points and the list of target addresses for the D2D communication for the terminal device for the D2D communication based on the first RAT. After receiving the first indication information, the network device may determine that the RRC information reported by the terminal device includes only the service information of the D2D communication based on the first RAT.

For another example, the first indication information may be used to indicate that the RRC information includes only the service information of the D2D communication based on the second RAT.

For another example, the first indication information may be used to indicate that the RRC information includes both the service information of the D2D communication based on the first RAT and the service information of the D2D communication based on the second RAT.

For example, the first indication information may use two bits to make indication to the network device. For example, when the first indication information is 00, it indicates that the RRC information includes only the service information of the D2D communication based on the first RAT. When the first indication information is 01, it indicates that the RRC information includes only the service information of the D2D communication based on the second RAT, and when the first indication information is 11, it indicates that the RRC information includes both the service information of the D2D communication based on the first RAT and the service information of the D2D communication based on the second RAT.

The first indication information may be carried in the RRC information to reduce signaling overhead. Of course, the first indication information may also be carried in other information, which is not specifically limited in the embodiments of the present disclosure.

It can be seen that the information included in the RRC information may be the service information of the D2D communication based on different RATs. In other words, the terminal device may define the RRC information to be reported based on different RATs.

Therefore, it is necessary to further specify the specific implementation manner for the terminal device to report the RRC information, so as to ensure that the network device can clearly know based on which RAT the RRC information reported by the terminal device is defined.

In some embodiments of the present disclosure, the terminal device may report the RRC information to the network device based on the second RAT. That is, the RRC information is defined according to the second RAT.

In such cases, since the network device is operating in the second RAT, if no additional indication is received, the network device can deem by default that the RRC information reported by the terminal device is information defined based on the second RAT.

In some other embodiments of the present disclosure, the terminal device may report the RRC information to the network device based on the first RAT. That is, the RRC information is defined according to the first RAT.

In such cases, since the network device is operating in the second RAT, if there is no additional indication, the network device does not know that the RRC information is information defined according to the first RAT.

In some other embodiments of the present disclosure, the terminal device may report the RRC information to the network device based on the first RAT and the second RAT, that is, the RRC information includes first information defined according to the first RAT and/or second information defined according to the second RAT. Optionally, the first information includes the service information of the D2D communication based on the first RAT, and the second information includes the service information of the D2D communication based on the second RAT.

In such cases, since the network device is operating in the second RAT, if there is no additional indication, the network device does not know that the RRC information includes the first information defined according to the first RAT and the second information defined according to the second RAT.

In the present disclosure, when the RRC information reported by the terminal device to the network device includes only the information defined according to the first RAT, or the RRC information reported by the terminal device to the network device includes both the information defined according to the first RAT and the information defined according to the second RAT, the terminal device may also send second indication information to the network device, where the second indication information is used to indicate that the RRC information is defined according to the first RAT and/or defined according to the second RAT. Thus, the network device may determine, according to the second indication information, that the RRC information reported by the terminal device is defined according to the first RAT and/or defined according to the second RAT.

The second indication information may be carried in the RRC information or in other information, which is not specifically limited in the embodiments of the present disclosure.

In the embodiments of the present disclosure, the terminal device may report the RRC information to the network device across RATs through the second indication information.

Continuing to refer to FIG. 3, the communication method 200 may further include the following.

In S220, the terminal device sends a Buffer Status Report (BSR) to the network device, where the BSR includes service traffic information and a target address index of the D2D communication based on the first RAT.

That is, after generating the BSR based on the service traffic information and the target address index of the D2D communication based on the first RAT, the terminal device sends the BSR to the network device. Thus, the network device can determine the target address corresponding to the target address index based on the target address index included in the received BSR.

As mentioned above, the RRC information sent by the terminal device to the network device may include the list of target addresses. The list of target addresses may include a correspondence between at least one index and at least one target address.

Therefore, after receiving the target address index sent by the terminal device, the network device determines, according to the target address index, the target address corresponding to the target address index in the list of target addresses.

In the above S220, if the terminal device further operates in the D2D communication mode based on the second RAT, the BSR may further include the service traffic information of the D2D communication based on the second RAT. That is, the terminal device may report the service traffic information of the D2D communication based on the first RAT and the service traffic information of the D2D communication based on the second RAT to the network device simultaneously. Further, the BSR may further include the target address index of the D2D communication based on the first RAT and the target address index of the D2D communication based on the second RAT.

Since the terminal device may perform the D2D communication based on the first RAT, and may also perform the D2D communication based on the second RAT, when determining the target address index, the terminal device may determine the target address index based on the D2D communication in the first RAT, and may also determine the target address index based on the D2D communication in the second RAT.

Therefore, the BSR reported by the terminal device to the network device may include one type of target address index for one RAT, and may also include two types of target address indexes for two RATs, which is not specifically limited in the embodiments of the disclosure. For example, when the BSR includes two types of target address indexes, the two types of target address indexes may include the index corresponding to the target address in RRC signaling based on the first RAT and/or the index corresponding to the target address in the RRC signaling based on the second RAT. Further, the formats of the two types of target address indexes may be the same or different, which is not specifically limited in the embodiments of the present disclosure.

In addition, as described above, the RRC information may include a list of target addresses for the D2D communication based on the first RAT and a list of target addresses for the D2D communication based on the second RAT.

If the format of the list of target addresses for the D2D communication based on the first RAT is different from the format of the list of target addresses for the D2D communication based on the second RAT, after the network device receives the target address index sent by the terminal device, it needs to determine whether to determine the target address corresponding to the target address index based on the list of target addresses for the D2D communication based on the first RAT, or to determine the target address corresponding to the target address index based on the list of target addresses for the D2D communication based on the second RAT. For example, when the number of the target address indexes is for only one RAT, the network device needs to determine which of the following is the list of target addresses corresponding to the target address index reported by the terminal device: the list of target addresses for the D2D communication based on the first RAT, and the list of target addresses for the D2D communication based on the second RAT. For another example, when there are target address indexes for two RATs, the network device needs to determine the list of target addresses corresponding to each target address index reported by the terminal device.

In some embodiments of the present disclosure, different RATs may correspond to different formats of the RRC signaling. Therefore, when the terminal device reports the BSR to the network device, the BSR may be sent in the format of the RRC information in the above S210.

Specifically, in the above S220, the terminal device may send the BSR to the network device by using the format corresponding to the RRC signaling based on the first RAT and/or the format corresponding to the RRC signaling based on the second RAT. The format corresponding to the RRC signaling includes but is not limited to the format of the list of target addresses in the RRC information, for example, the format and/or the number of indexes corresponding to the target addresses in the list of target addresses.

In some embodiments of the present disclosure, the terminal device sends the BSR to the network device by using a target address index format corresponding to the RRC signaling based on the first RAT and/or the target address index format corresponding to the RRC signaling based on the second RAT. The target address index format may refer to the format of the index corresponding to the target address in the list of target addresses in the RRC information.

For example, the target address index format corresponding to the RRC signaling based on the first RAT is a 4-bit format, and the target address index format corresponding to the RRC signaling based on the second RAT is an 8-bit format. In other words, when the terminal device reports the target address index to the network device, the format of the target address index may be used to indicate the list of target addresses corresponding to the target address index reported by the terminal device.

In some other embodiments of the present disclosure, the terminal device sends the BSR to the network device by using the number of the target address indexes corresponding to the RRC signaling based on the first RAT and/or the number of the target address indexes corresponding to the RRC signaling based on the second RAT.

For example, when the target address indexes reported by the terminal device to the network device are for two RATs and are the same, the terminal device may indicate that the target address indexes reported by the terminal device correspond to the list of target addresses for the D2D communication based on the first RAT and the list of target addresses for the D2D communication based on the second RAT, respectively.

It should be understood that, in the embodiments of the present disclosure, for the same target address, the D2D communication based on the first RAT and the D2D communication based on the second RAT may use the same target address index or different target address indexes, which is not particularly limited in the embodiments of the present disclosure.

For example, for the same target address, the D2D communication based on the first RAT and the D2D communication based on the second RAT may use the same target address index. For another example, for the same target address, the D2D communication based on the first RAT and the D2D communication based on the second RAT may use different target address indexes.

For another example, for the same target address, the D2D communications based on the first RAT of different frequencies use the same target address. For another example, for the same target address, the D2D communications based on the second RAT of different frequencies use the same target address.

Similar to S210, in S220, the terminal device may communicate with the network device based on the first RAT and/or the second RAT. That is, after the network device receives the BSR reported by the terminal device, it needs to correctly distinguish whether the BSR is the information defined based on the first RAT or the information defined based on the second RAT.

In some embodiments of the present disclosure, the terminal device may report the BSR to the network device based on the second RAT. That is, the BSR is defined according to the second RAT.

In such cases, since the network device is operating in the second RAT, if the network device does not receive additional indication, the network device can deem by default that the BSR reported by the terminal device is information defined based on the second RAT.

In some other embodiments of the present disclosure, the terminal device may report the BSR to the network device based on the first RAT. That is, the BSR is defined according to the first RAT.

In such cases, since the network device is operating in the second RAT, if there is no additional indication, the network device does not know that the BSR reported by the terminal device is the information defined based on the first RAT.

In some other embodiments of the present disclosure, the terminal device may report the BSR to the network device based on the first RAT and the second RAT, that is, the BSR includes third information defined according to the first RAT and fourth information defined according to the second RAT. In some embodiments, the third information includes the service traffic information of the D2D communication based on the first RAT, and the fourth information includes the service traffic information of the D2D communication based on the second RAT. Further, the third information may further include a target address index of the D2D communication based on the first RAT, and the fourth information may include a target address index of the D2D communication based on the second RAT.

In such cases, since the network device is operating in the second RAT, if there is no additional indication, the network device does not know that the BSR includes the information defined according to the first RAT and the information defined according to the second RAT.

In the present disclosure, when the BSR reported by the terminal device to the network device includes only the information defined according to the first RAT, or the BSR reported by the terminal device to the network device includes both the information defined according to the first RAT and the information defined according to the second RAT, the terminal device may also send third indication information to the network device. The third indication information is used to indicate that the BSR is defined according to the first RAT and/or defined according to the second RAT.

For example, the third indication information indicates, through a logical channel identifier (LCID), that the BSR is defined according to the first RAT and/or defined according to the second RAT. However, the embodiments of the present disclosure are not limited thereto. For example, the third indication information may also be indicated through specific bits.

Further, the terminal device may also send fourth indication information to the network device, where the fourth indication information is used to indicate that the BSR includes the service traffic information in the first RAT and/or the service traffic information in the second RAT.

For example, the fourth indication information indicates through the LCID that the BSR includes the service traffic information in the first RAT and/or service traffic information in the second RAT.

Some embodiments of the present disclosure are described in detail above with reference to the accompanying drawings. However, the present disclosure is not limited to the specific details in the foregoing embodiments, and many simple variations can be made to the technical solutions of the present disclosure within the scope of the technical concept of the present disclosure, which all fall within the protection scope of the present disclosure.

For example, various specific technical features described in the above specific embodiments can be combined in any suitable manner without contradiction. In order to avoid unnecessary repetition, various possible combinations will not be described in the present disclosure.

For another example, various different implementations of the present disclosure can also be combined arbitrarily, as long as they do not violate the idea of the present disclosure, which should also be regarded as the content disclosed in the present disclosure.

It should be understood that in the method embodiments of the present disclosure, the sequence numbers of the above-mentioned processes do not mean the performing order, and the performing order of the processes should be determined according to the functions and the internal logic thereof, and should not limit the implementations of the embodiments of the present disclosure.

The method embodiments of the present disclosure are described in detail above in conjunction with FIG. 3, and the device embodiments of the present disclosure will be described in detail below in conjunction with FIG. 4 to FIG. 7.

Figure 4:
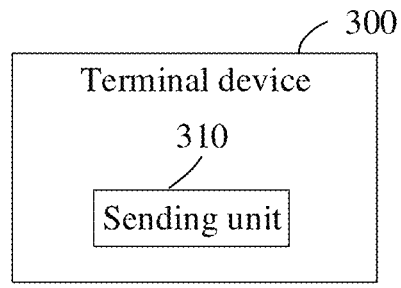
FIG. 4 is a schematic block diagram of a terminal device according to an embodiment of the present disclosure.

FIG. 4 is a schematic block diagram of a terminal device 300 according to an embodiment of the present disclosure.

Specifically, as shown in FIG. 4, the terminal device operates at least in a device-to-device (D2D) communication mode based on the first Radio Access Technology (RAT), and the terminal device 300 may include a sending unit 310 configured to send medium access control (RRC) information to a network device operating in a second RAT, where the RRC information includes service information of D2D communication based on a first RAT.

Optionally, in some embodiments of the present disclosure, the terminal device also operates in a D2D communication mode based on the second RAT, where the RRC information further includes service information of the D2D communication based on the second RAT.

Optionally, in some embodiments of the present disclosure, the RRC information further includes first indication information, and the first indication information is used to indicate that the RRC information includes the service information of the D2D communication based on the first RAT and/or the service information of the D2D communication based on the second RAT.

Optionally, in some embodiments of the present disclosure, the RRC information is defined according to the second RAT.

Optionally, in some embodiments of the present disclosure, the RRC information is defined according to the first RAT.

Optionally, in some embodiments of the present disclosure, the RRC information includes first information defined according to the first RAT and second information defined according to the second RAT.

Optionally, in some embodiments of the present disclosure, the first information includes the service information of the D2D communication based on the first RAT, and the second information includes the service information of the D2D communication based on the second RAT.

Optionally, in some embodiments of the present disclosure, the sending unit 310 is further configured to send second indication information to the network device, where the second indication information is used to indicate that the RRC information is defined according to the first RAT and/or defined according to the second RAT.

Optionally, in some embodiments of the present disclosure, the RRC information includes the second indication information.

Optionally, in some embodiments of the present disclosure, the sending unit 310 is further configured to send a Buffer Status Report (BSR) to the network device, where the BSR includes service traffic information and a target address index of the D2D communication based on the first RAT.

Optionally, in some embodiments of the present disclosure, for the same target address, the D2D communication based on the first RAT and the D2D communication based on the second RAT use the same target address index.

Optionally, in some embodiments of the present disclosure, for the same target address, the D2D communication based on the first RAT and the D2D communication based on the second RAT use different target address indexes.

Optionally, in some embodiments of the present disclosure, for the same target address, the D2D communications based on the first RAT of different frequencies use the same target address.

Optionally, in some embodiments of the present disclosure, for the same target address, the D2D communications based on the second RAT of different frequencies use the same target address.

Optionally, in some embodiments of the present disclosure, the BSR is defined according to the second RAT.

Optionally, in some embodiments of the present disclosure, the BSR is defined according to the first RAT.

Optionally, in some embodiments of the present disclosure, the BSR includes third information defined according to the first RAT and fourth information defined according to the second RAT.

Optionally, in some embodiments of the present disclosure, the third information includes the service traffic information of the D2D communication based on the first RAT, and the fourth information includes the service traffic information of the D2D communication based on the second RAT.

Optionally, in some embodiments of the present disclosure, the sending unit 310 is further configured to send third indication information to the network device, where the third indication information is used to indicate that the BSR is defined according to the first RAT and/or defined according to the second RAT.

Optionally, in some embodiments of the present disclosure, the third indication information indicates through a logical channel identifier (LCD) that the BSR is defined according to the first RAT and/or defined according to the second RAT.

Optionally, in some embodiments of the present disclosure, the sending unit 310 is further configured to send fourth indication information to the network device, where the fourth indication information is used to indicate that the BSR includes the service traffic information in the first RAT and/or the service traffic information in the second RAT.

Optionally, in some embodiments of the present disclosure, the fourth indication information indicates through a logical channel identifier (LCD) that the BSR includes the service traffic information in the first RAT and/or the service traffic information in the second RAT.

Optionally, in some embodiments of the present disclosure, the sending unit 310 is further configured to send the BSR to the network device using a format corresponding to RRC signaling based on the first RAT and/or a format corresponding to RRC signaling based on the second RAT.

Optionally, in some embodiments of the present disclosure, the sending unit 310 is further configured to send the BSR to the network device using a target address index format corresponding to the RRC signaling based on the first RAT and/or a target address index format corresponding to the RRC signaling based on the second RAT.

Optionally, in some embodiments of the present disclosure, the sending unit 310 is further configured to send the BSR to the network device using the number of target address indexes corresponding to the RRC signaling based on the first RAT and/or the number of target address indexes corresponding to the RRC signaling based on the second RAT.

Optionally, in some embodiments of the present disclosure, the target address index includes the index corresponding to the target address in the RRC signaling based on the first RAT and/or the index corresponding to the target address in the RRC signaling based on the second RAT.

Optionally, in some embodiments of the present disclosure, the service information includes frequency point information and a list of target addresses used by the terminal device for the D2D communication, and the list of target addresses is used to determine the target address index.

It should be understood that the device embodiments and the method embodiments may correspond to each other, and similar descriptions may refer to the method embodiments. Specifically, the terminal device 300 shown in FIG. 4 may correspond to a subject that performs the method 200 in the embodiments of the present disclosure, and the foregoing and other operations and/or functions of the various units in the terminal device 300 are respectively used to realize the corresponding procedures in the methods shown in FIG. 3, which will not be repeated for the sake of brevity.

Figure 5:
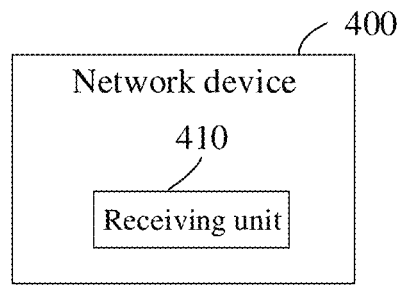
FIG. 5 is a schematic block diagram of a network device according to an embodiment of the present disclosure.

FIG. 5 is a schematic block diagram of a network device 400 according to an embodiment of the present disclosure. The network device operates based on the second Radio Access Technology (RAT).

As shown in FIG. 5, the network device 400 may include a receiving unit 410 configured to receive media access control (RRC) information at least operating in a device-to-device (D2D) communication mode based on a first RAT, where the RRC information includes service information of D2D communication based on the first RAT.

Optionally, in some embodiments of the present disclosure, the terminal device also operates in a D2D communication mode based on the second RAT, where the RRC information further includes service information of the D2D communication based on the second RAT.

Optionally, in some embodiments of the present disclosure, the RRC information further includes first indication information, and the first indication information is used to indicate that the RRC information includes the service information of the D2D communication based on the first RAT and/or the service information of the D2D communication based on the second RAT.

Optionally, in some embodiments of the present disclosure, the RRC information is defined according to the second RAT.

Optionally, in some embodiments of the present disclosure, the RRC information is defined according to the first RAT.

Optionally, in some embodiments of the present disclosure, the RRC information includes first information defined according to the first RAT and second information defined according to the second RAT.

Optionally, in some embodiments of the present disclosure, the first information includes the service information of the D2D communication based on the first RAT, and the second information includes the service information of the D2D communication based on the second RAT.

Optionally, in some embodiments of the present disclosure, the receiving unit 410 is further configured to receive second indication information sent by the terminal device, where the second indication information is used to indicate that the RRC information is defined according to the first RAT and/or defined according to the second RAT.

Optionally, in some embodiments of the present disclosure, the RRC information includes the second indication information.

Optionally, in some embodiments of the present disclosure, the receiving unit 410 is further configured to receive a Buffer Status Report (BSR) sent by the terminal device, where the BSR includes service traffic information and a target address index of the D2D communication based on the first RAT.

Optionally, in some embodiments of the present disclosure, for the same target address, the D2D communication based on the first RAT and the D2D communication based on the second RAT use the same target address index.

Optionally, in some embodiments of the present disclosure, for the same target address, the D2D communication based on the first RAT and the D2D communication based on the second RAT use different target address indexes.

Optionally, in some embodiments of the present disclosure, for the same target address, the D2D communications based on the first RAT of different frequencies use the same target address.

Optionally, in some embodiments of the present disclosure, for the same target address, the D2D communications based on the second RAT of different frequencies use the same target address.

Optionally, in some embodiments of the present disclosure, the BSR is defined according to the second RAT.

Optionally, in some embodiments of the present disclosure, the BSR is defined according to the first RAT.

Optionally, in some embodiments of the present disclosure, the BSR includes third information defined according to the first RAT and fourth information defined according to the second RAT.

Optionally, in some embodiments of the present disclosure, the third information includes the service traffic information of the D2D communication based on the first RAT, and the fourth information includes the service traffic information of the D2D communication based on the second RAT.

Optionally, in some embodiments of the present disclosure, the receiving unit 410 is further configured to receive third indication information sent by the terminal device, where the third indication information is used to indicate that BSR is defined according to the first RAT and/or defined according to the second RAT.

Optionally, in some embodiments of the present disclosure, the third indication information indicates through a logical channel identifier (LCD) that the BSR is defined according to the first RAT and/or defined according to the second RAT.

Optionally, in some embodiments of the present disclosure, the receiving unit 410 is further configured to receive fourth indication information sent by the terminal device, where the fourth indication information is used to indicate that the BSR includes the service traffic information in the first RAT and/or the service traffic information in the second RAT.

Optionally, in some embodiments of the present disclosure, the fourth indication information indicates through a logical channel identifier (LCD) that the BSR includes the service traffic information in the first RAT and/or the service traffic information in the second RAT.

Optionally, in some embodiments of the present disclosure, the receiving unit 410 is specifically configured to receive the BSR sent by the terminal device using a format corresponding to RRC signaling based on the first RAT and/or a format corresponding to RRC signaling based on the second RAT.

Optionally, in some embodiments of the present disclosure, the receiving unit 410 is further specifically configured to receive the BSR sent by the terminal device using a target address index format corresponding to the RRC signaling based on the first RAT and/or a target address index format corresponding to the RRC signaling based on the second RAT.

Optionally, in some embodiments of the present disclosure, the receiving unit 410 is further specifically configured to receive the BSR sent by the terminal device using the number of target address indexes corresponding to the RRC signaling based on the first RAT and/or the number of target address indexes corresponding to the RRC signaling based on the second RAT.

Optionally, in some embodiments of the present disclosure, the target address index includes the index corresponding to the target address in the RRC signaling based on the first RAT and/or the index corresponding to the target address in the RRC signaling based on the second RAT.

Optionally, in some embodiments of the present disclosure, the service information includes frequency point information and a list of target addresses used by the terminal device for the D2D communication, and the list of target addresses is used to determine the target address index.

It should be understood that the device embodiments and the method embodiments may correspond to each other, and similar descriptions may refer to the method embodiments. Specifically, the network device 400 shown in FIG. 5 may correspond to a subject that performs the method 200 in the embodiments of the present disclosure, and the foregoing and other operations and/or functions of the various units in the network device 400 are respectively used to realize the corresponding procedures in the methods shown in FIG. 3, which will not be repeated here for the sake of brevity.

The communication device according to the embodiments of the present disclosure is described above from the perspective of functional modules in conjunction with FIG. 4 and FIG. 5. It should be understood that the functional module can be implemented in the form of hardware, can be implemented in the form of software instructions, or can be implemented in a combination of hardware and software modules.

Specifically, the steps of the method embodiments in the embodiments of the present disclosure can be completed by hardware integrated logic circuits in the processor and/or instructions in the form of software, the steps of the methods disclosed in the embodiments of the present disclosure can be directly embodied as being performed and completed by hardware decoding processor, or can be performed and completed by a combination of hardware and software modules in the decoding processor.

Optionally, the software modules may be located in a mature storage medium in the field, such as a random access memory, a flash memory, a read-only memory, a programmable read-only memory, an electrically erasable programmable memory, and a register. The storage medium is located in the memory, and the processor reads information in the memory and completes the steps in the foregoing method embodiments in combination with its hardware.

For example, in the embodiments of the present disclosure, both the sending unit 310 shown in FIG. 4 and the receiving unit 410 shown in FIG. 5 can be implemented by a transceiver.

Figure 6:
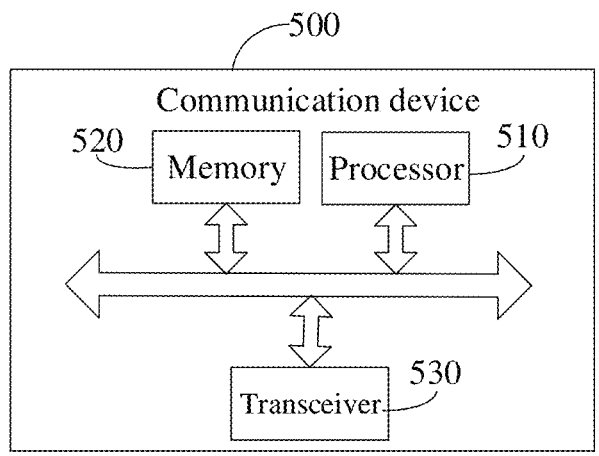
FIG. 6 is a schematic block diagram of a communication device according to an embodiment of the present disclosure.

FIG. 6 is a schematic structural diagram of a communication device 500 according to an embodiment of the present disclosure. The communication device 500 shown in FIG. 6 includes a processor 510. The processor 510 can call and run a computer program from a memory to carry out the methods in the embodiments of the present disclosure.

Optionally, as shown in FIG. 6, the communication device 500 may further include a memory 520. The memory 520 may be configured to store indication information, and may be further configured to store codes, instructions, etc. executed by the processor 510. The processor 510 may call and run a computer program from the memory 520 to implement the methods in the embodiments of the present disclosure.

The memory 520 can be a separate device independent of the processor 510, or can be integrated in the processor 510.

Optionally, as shown in FIG. 6, the communication device 500 can further include a transceiver 530, and the processor 510 can control the transceiver 530 to communicate with other devices, and specifically, to transmit information or data to other devices, or to receive information or data transmitted from other devices.

The transceiver 530 can include a transmitter and a receiver. The transceiver 530 can further include an antenna, and the number of the antennas can be one or more.

Optionally, the communication device 500 may be a terminal device in the embodiments of the present disclosure, and the communication device 500 may implement the corresponding process implemented by the terminal device in the methods of the embodiments of the present disclosure, that is, the communication device 500 according to the embodiments of the present disclosure may correspond to the terminal device 300 in the embodiments of the present disclosure, and may correspond to a subject that performs the method 200 according to the embodiments of the present disclosure, which will not be repeated here for the sake of brevity.

Optionally, the communication device 500 may be a network device in the embodiments of the present disclosure, and the communication device 500 may implement the corresponding process implemented by the network device in the methods of the embodiments of the present disclosure, that is, the communication device 500 according to the embodiments of the present disclosure may correspond to the network device 400 in the embodiments of the present disclosure, and may correspond to a subject that performs the method 200 according to the embodiments of the present disclosure, which will not be repeated here for the sake of brevity.

It should be understood that the various components in the communication device 500 are connected through a bus system, where in addition to a data bus, the bus system includes a power bus, a control bus, and a status signal bus.

In addition, the embodiments of the present disclosure also provides a chip, which may be an integrated circuit chip with signal processing capability, and can implement or execute the methods, steps, and logical block diagrams disclosed in the embodiments of the present disclosure.

Optionally, the chip can be applied to various communication devices, so that the communication device installed with the chip can perform the methods, steps, and logical block diagrams disclosed in the embodiments of the present disclosure.

Figure 7:
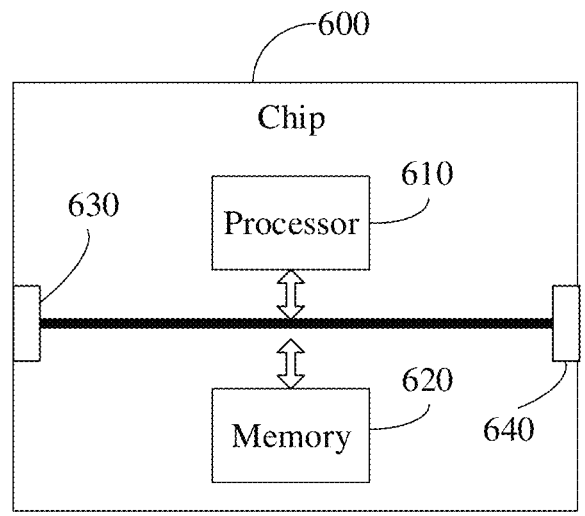
FIG. 7 is a schematic diagram of a chip according to an embodiment of the present disclosure.

FIG. 7 is a schematic structural diagram of a chip according to an embodiment of the present disclosure.

The chip 600 shown in FIG. 7 includes a processor 610, and the processor 610 can call and run a computer program from a memory to implement the methods in the embodiments of the present disclosure.

Optionally, as shown in FIG. 7, the chip 600 may further include a memory 620. The processor 610 may call and run a computer program from the memory 620 to implement the methods in the embodiments of the present disclosure. The memory 620 may be configured to store indication information, and may be further configured to store codes, instructions, etc. executed by the processor 610.

The memory 620 can be a separate device independent of the processor 610, or can be integrated in the processor 610.

Optionally, the chip 600 can further include an input interface 630. The processor 610 can control the input interface 630 to communicate with other devices or chips, and specifically, to obtain information or data transmitted by other devices or chips.

Optionally, the chip 600 can further include an output interface 640. The processor 610 can control the output interface 640 to communicate with other devices or chips, and specifically, to output information or data to other devices or chips.

Optionally, the chip can be applied to the network device in the embodiments of the present disclosure, and the chip can carry out the corresponding processes which are implemented by the network device in the methods of the embodiments of the present disclosure, which will not be repeated here for the sake of brevity.

Optionally, the chip can be applied to the terminal device in the embodiments of the present disclosure, and the chip can carry out the corresponding processes which are implemented by the terminal device in the methods of the embodiments of the present disclosure, which will not be repeated here for the sake of brevity.

It should be understood that the chip mentioned in the embodiments of the present disclosure may also be referred to as a system-level chip, a system chip, a chip system, or a system-on-chip. It should also be understood that the components in the chip 600 are connected by a bus system, where in addition to a data bus, the bus system includes a power bus, a control bus, and a status signal bus.

The processor may include but is not limited to a general-purpose processor, a digital signal processor (DSP), an application specific integrated circuit (ASIC), a Field Programmable Gate Array (FPGA) or other programmable logic devices, discrete gates or transistor logic devices, discrete hardware components, etc.

The processor may be configured to implement or perform the methods, steps, and logical block diagrams disclosed in the embodiments of the present disclosure. The steps of the methods disclosed in the embodiments of the present disclosure may be directly embodied as being executed and completed by a hardware decoding processor, or executed and completed by a combination of hardware and software modules in the decoding processor. The software module can be located in a mature storage medium in the field, such as a random access memory, a flash memory, a read-only memory, a programmable read-only memory, an erasable programmable memory, or a register. The storage medium is located in the memory, and the processor reads the information in the memory and completes the steps of the above methods in combination with its hardware.

The memory includes but is not limited to a volatile memory and/or a non-volatile memory. The non-volatile memory can be a Read-Only Memory (ROM), a Programmable ROM (PROM), an erasable PROM (EPROM), an electrically EPROM (EEPROM) or a flash memory. The volatile memory may be a Random Access Memory (RAM), which is used as an external cache. By way of exemplary but not restrictive description, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch link DRAM (SLDRAM)) and a Direct Rambus RAM (DR RAM).

It should be noted that the memories of the systems and methods described herein are intended to include, but are not limited to, these and any other suitable types of memories.

The embodiments of the present disclosure also provide a computer-readable storage medium for storing computer programs. The computer-readable storage medium stores one or more programs, and the one or more programs include instructions that, when executed by a portable electronic device that includes multiple application programs, can cause the portable electronic device to perform the method 200 in the embodiments of the present disclosure.

Optionally, the computer-readable storage medium can be applied to the network device in the embodiments of the present disclosure, and the computer program causes a computer to perform the corresponding processes which are implemented by the network device in the methods of the embodiments of the present disclosure, which will not be repeated here for the sake of brevity.

Optionally, the computer-readable storage medium can be applied to the mobile terminal/terminal device in the embodiments of the present disclosure, and the computer program causes a computer to perform the corresponding processes which are implemented by the mobile terminal/terminal device in the methods of the embodiments of the present disclosure, which will not be repeated here for the sake of brevity.

An embodiment of the present disclosure also provides a computer program product including a computer program.

Optionally, the computer program product can be applied to the network device in the embodiments of the present disclosure, and the computer program causes a computer to perform the corresponding processes implemented by the network device in the methods according to the embodiments of the present disclosure, which will not be repeated here for the sake of brevity.

Optionally, the computer program product can be applied to the mobile terminal/terminal device in the embodiments of the present disclosure, and the computer program causes a computer to perform the corresponding processes which are implemented by the mobile terminal/terminal device in the methods of the embodiments of the present disclosure, which will not be repeated here for the sake of brevity.

An embodiment of the disclosure also provides a computer program. The computer program, when being executed by a computer, causes the computer to perform the methods of the embodiments of the method 200.

Optionally, the computer program can be applied to the network device in the embodiments of the present disclosure, and when running on a computer, the computer program causes the computer to perform the corresponding process implemented by the network device in the methods according to the embodiments of the present disclosure, which will not be repeated here for the sake of brevity.

The embodiments of the present disclosure also provide a communication system. The communication system may include a terminal device 300 as shown in FIG. 4 and a network device 400 as shown in FIG. 5. The terminal device 300 may be configured to implement the corresponding functions implemented by the terminal device in the above method 200, and the network device 400 may be configured to implement the corresponding functions implemented by the network device in the above method 200, which will not be repeated here for the sake of brevity.

It should be noted that the term "system" herein can also be referred to as a "network management architecture" or a "network system".

It should also be understood that the terms used in the embodiments of the present disclosure and the appended claims are only for the purpose of describing specific embodiments, and are not intended to limit the embodiments of the present disclosure.

For example, the singular forms of "a", "said", "above" and "the" used in the embodiments of the present disclosure and the appended claims are also intended to include plural forms, unless the context clearly indicates otherwise.

Those skilled in the art can recognize that the exemplary units and algorithm steps described in connection with the embodiments disclosed herein can be implemented in electronic hardware or a combination of computer software and the electronic hardware. Whether these functions are implemented in hardware or in software depends on the specific applications of the technical solutions and design constraints. Various methods can be used by professional technicians to implement the described functions for each specific application, and such implementations should not be considered as going beyond the scope of the embodiments of the present disclosure.

If it is implemented in the form of software functional units and sold or used as an independent product, it can be stored in a computer-readable storage medium. Based on such understanding, the technical solution of the embodiments of the present disclosure essentially, a part thereof that contributes to the prior art, or a part of the technical solution can be embodied in the form of a software product, and the computer software product is stored in a storage medium and includes instructions which cause a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those skilled in the art can clearly understand that for convenience and conciseness of the description, for the specific operating process of the systems, devices and units described above, reference can be made to corresponding processes in the foregoing method embodiments, which will not be repeated here.

It should be understood that in the several embodiments provided in the present disclosure, the disclosed system, device, and method may be implemented in other ways.

For example, the division of units, modules or components in the device embodiments described above is only a logical function division, and there may be other divisions in actual implementation. For example, multiple units, modules or components can be combined or integrated into another system, or some units, modules or components can be ignored or not executed.

For another example, the aforementioned units/modules/components described as separate/display components may or may not be physically separated, that is, they may be located in one place, or they may be distributed on multiple network units. Some or all of the units/modules/components may be selected according to actual needs to achieve the objectives of the embodiments of the present disclosure.

Finally, it should be noted that the coupling, direct coupling or communication connection shown or discussed above may be indirect coupling or communication connection through some interfaces, devices or units, and may be in electrical, mechanical or other forms.

Those described above are only specific implementations of the embodiments of the present disclosure, and the protection scope of the embodiments of the present disclosure is not limited thereto. Any alteration or replacement readily devised by a person skilled in the art within the technical scope disclosed in the embodiments of the present disclosure shall fall within the scope of the present disclosure. Therefore, the protection scope of the present disclosure shall be subject to the protection scope of the claims.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be defined by the claims.

What is claimed is:

1. A method for sending information, applied to a terminal device that operates at least in a device-to-device (D2D) communication mode based on a first Radio Access Technology (RAT), comprising:
    sending, by the terminal device, Radio Resource Control (RRC) information to a network device operating in a second RAT, wherein the RRC information comprises service information of D2D communication based on the first RAT,
    wherein the RRC information is defined according to the first RAT, and
    wherein the service information comprises frequency point information and a list of target addresses used by the terminal device for D2D communication, and the list of target addresses is used for determining a target address index.

2. The method according to claim 1, wherein the terminal device further operates in a D2D communication mode based on the second RAT, and wherein the RRC information further comprises service information of D2D communication based on the second RAT.

3. The method according to claim 2, wherein the RRC information further comprises first indication information, and the first indication information is used to indicate that the RRC information comprises the service information of the D2D communication based on at least one of the first RAT or the second RAT.

4. The method according to claim 1, wherein the service information is Sidelink UE Information of the terminal device.

5. A terminal device, operating at least in a device-to-device (D2D) communication mode based on a first Radio Access Technology (RAT) and comprising:
- a processor;
- a memory configured to store a computer program executable by the processor; and
- a transceiver configured to send Radio Resource Control (RRC) information to a network device operating in a second RAT, wherein the RRC information comprises service information of D2D communication based on the first RAT,
- wherein the RRC information is defined according to the first RAT, and
- wherein the service information comprises frequency point information and a list of target addresses used by the terminal device for D2D communication, and the list of target addresses is used for determining a target address index.

6. The terminal device according to claim 5, wherein the service information is Sidelink UE Information of the terminal device.

7. The terminal device according to claim 5, wherein the RRC information comprises first information defined according to the first RAT and second information defined according to the second RAT.

8. The terminal device according to claim 7, wherein the first information comprises the service information of the D2D communication based on the first RAT, and the second information comprises the service information of the D2D communication based on the second RAT.

9. The terminal device according to claim 5, wherein the transceiver is further configured to:
send a Buffer Status Report (BSR) to the network device, wherein the BSR comprises service traffic information and a target address index of the D2D communication based on the first RAT.

10. A network device, operating in a second Radio Access Technology (RAT) and comprising:
- a processor;
- a memory configured to store a computer program executable by the processor; and
- a transceiver configured to receive Radio Resource Control (RRC) information sent from a terminal device operating at least in a device-to-device (D2D) communication mode based on a first RAT, wherein the RRC information comprises service information of D2D communication based on the first RAT,
- wherein the RRC information is defined according to the first RAT, and
- wherein the service information comprises frequency point information and a list of target addresses used by the terminal device for D2D communication, and the list of target addresses is used for determining a target address index.

11. The network device according to claim 10, wherein the terminal device further operates in a D2D communication mode based on the second RAT, and wherein the RRC information further comprises service information of D2D communication based on the second RAT.

12. The network device according to claim 11, wherein the RRC information further comprises first indication information, and the first indication information is used to indicate that the RRC information comprises the service information of the D2D communication based on at least one of the first RAT or the second RAT.

13. The network device according to claim 10, wherein the service information is Sidelink UE Information of the terminal device.

14. The network device according to claim 10, wherein the transceiver is further configured to:
receive a Buffer Status Report (BSR) sent by the terminal device, wherein the BSR comprises service traffic information and a target address index of the D2D communication based on the first RAT.

15. The method according to claim 1, further comprising:
sending a Buffer Status Report (BSR) to the network device, wherein the BSR comprises service traffic information and a target address index of the D2D communication based on the first RAT.

16. The terminal device according to claim 5, wherein the terminal device further operates in a D2D communication mode based on the second RAT, and wherein the RRC information further comprises service information of D2D communication based on the second RAT.

17. The terminal device according to claim 16, wherein the RRC information further comprises first indication information, and the first indication information is used to indicate that the RRC information comprises the service information of the D2D communication based on at least one of the first RAT or the second RAT.

* * * * *